United States Patent [19]

Butler

[11] Patent Number: 4,845,688

[45] Date of Patent: Jul. 4, 1989

[54] ELECTRO-MECHANICAL TRANSDUCTION APPARATUS

[75] Inventor: John L. Butler, Marshfield, Mass.

[73] Assignee: Image Acoustics, Inc., North Marshfield, Mass.

[21] Appl. No.: 170,892

[22] Filed: Mar. 21, 1988

[51] Int. Cl.$^4$ .................................................. H04R 17/00
[52] U.S. Cl. ..................................... 367/174; 367/163; 367/168
[58] Field of Search ............... 367/163, 174, 158, 165, 367/173, 155, 156, 157, 168, 142; 310/337

[56] References Cited

U.S. PATENT DOCUMENTS

| | | | |
|---|---|---|---|
| 3,258,738 | 6/1966 | Merchant | 367/155 |
| 3,277,433 | 10/1966 | Toulis | 367/155 |
| 4,072,871 | 2/1978 | Wilson | 310/310 |
| 4,409,681 | 11/1983 | White | 367/166 |
| 4,432,080 | 2/1984 | Wardle | 367/163 |
| 4,524,693 | 6/1985 | McMahon et al. | 102/491 |

OTHER PUBLICATIONS

"The Flextensional Concept: A New Approach to the Design of Underwater Acoustic Transducers" by Royster, Applied Acoustics, No. 2, 1970, pp. 117–126.

Primary Examiner—Deborah L. Kyle
Assistant Examiner—John Woodrow Eldred
Attorney, Agent, or Firm—Wolf, Greenfield & Sacks

[57] ABSTRACT

An electro-mechanical spring which provides amplified motion as well as a compliant structure for attachment, at the locations of maximum motion, to other mechanical or acoustical loads or elements. The spring produces motion in a directional orthogonal to the direction of a piezoelectric or magnetostrictive drive member connected along the major axis of a complete shell. The electro-mechanical spring provides a means for obtaining a low frequency large displacement piston type transducer.

37 Claims, 6 Drawing Sheets

ELECTRO-MECHANICAL TRANSDUCTION APPARATUS

RELATED APPLICATIONS

Reference is now made to my two earlier filed patent applications including application Ser. No. 06/873,961 filed June 13, 1986, now U.S. Pat. No. 4,742,499, on a Flextensional Transducer, and application Ser. No. 06/941,106 filed Dec. 12, 1986, now U.S. Pat. No. 4,754,441, on a Directional Flextensional Transducer.

BACKGROUND OF THE INVENTION

1. Field of the Invention

The present invention relates in general to an electro-mechanical transduction apparatus. More particularly, the present invention pertains to an electro-mechanical spring apparatus that is based upon flextensional transducer techniques. Even more particularly the present invention relates to an acoustic transduction device which in particular is adapted to provide large displacement at low resonant frequencies.

2. Background Discussion

Underwater acoustic transducers typically utilize piezoelectric or magnetostrictive materials to produce intense acoustic signals. Since these materials are quite stiff, the design of a compact piston transducer which resonates at low frequencies becomes difficult to achieve unless, of course, a large mass is used. This is not always a satisfactory solution as it increases the energy stored and raises the mechanical Q of the system. Accordingly, systems with lower stiffness, such as an electrodynamic or a variable reluctance mechanism are often used as low frequency resonators. These systems, however, are generally not sufficiently rugged, particularly in connection with the environmental conditions imposed upon such transducers.

One solution for the stiffer drive systems, such as systems using piezoelectric ceramic material, has been to use flexural bars or plates driven into a low frequency bending mode by means of piezoelectric material attached firmly to one side or both sides of the plate. Multiple units may be connected together in mechanical series to increase the displacement and obtain a low resonant frequency. A difficulty with the bending plate is that the piezoelectric material is directly attached to the bending plate and this construction limits the amount of stress in the vibrating system since the ceramic material is quite weak in tension. Also large stresses can effect the electro-mechanical performance.

Reference is also made to the field of flextensional transducers. In a flextensional transducer only the shell (typically a metal) bends and radiates energy. The flextensional transducer patents of H. C. Hayes, U.S. Pat. No. 2,064,911 (Dec. 22, 1936), W. J. Toulis, U.S. Pat. No. 3,277,433 (Oct. 4, 1966) and H. C. Merchant U.S. Pat. No. 3,258,738 (June 28, 1966) show means for obtaining low frequency resonances with the use of magnetostrictive or piezoelectric active material as a driver along the major axis of a shell in the form of an ellipse or oval shape. These devices, however, normally radiate from both sides and baffles are generally needed to control the radiation. Also, the vibrating surface does not vibrate with a uniform velocity and most of the radiating surface moves with a velocity less than the peak value at the center line of the shell.

Accordingly, it is an object of the present invention to provide an improved electro-mechanical transduction apparatus.

Another object of the present invention is to provide a compliant electro-mechanical spring transduction device in which either piezoelectric or magnetostrictive members provide motion that is magnified by a flextural-extensional (flextensional) induced bending motion for providing large displacements.

A further object of the present invention is to provide an improved electro-mechanical transduction apparatus that provides a low frequency large displacement, and embodied as a piston transducer in relatively compact construction.

Still another object of the present invention is to provide an improved electro-mechanical spring that is energized by piezoelectric or magnetostrictive material and in which the spring amplifies the motion of the active material and is combinable either in series to obtain greater displacement or in parallel to obtain greater force.

Another object of the present invention is to provide an improved electro-mechanical transduction apparatus that may be embodied either as a spring, valve or actuator.

SUMMARY OF THE INVENTION

To accomplish the foregoing and other objects, features and advantages of the invention there is now described herein an improved electro-mechanical transduction apparatus primarily embodied herein as an electro-mechanical spring that may be used in a number of different applications such as for a valve, actuator or underwater sound transducer. The apparatus of the present invention may be used individually or in tandem to create mechanical motions. Of particular interest in accordance with one embodiment of the invention there is provided a low frequency piston type transducer capable of large magnified displacements when driven by piezoelectric or magnetostrictive means. The concepts of the present invention permit fabrication of a device in compact size. The compactness of the invention is due at least in part to the arrangement of the drive member being disposed in an orthogonal manner to the output motion.

In accordance with the invention there is provided an electro-mechanical transduction apparatus that is comprised of a flextensional transducer shell having orthogonally disposed first and second shell axes, and a transduction drive means having opposed ends. Means are provided for connecting the transduction drives at its opposed ends to the flextensional transducer shell in a position disposed along a first shell axis. The first axis is preferably a major axis of the shell and the second axis is a minor axis, thus providing amplification of motion occasioned by the transduction drive means, in particular along the minor axis of the shell. A mass load is connected to the flextensional transducer shell at at least one location along the second shell axis. Means are provided for exciting the transduction drive means to cause the shell to move in the direction of the first axis to in turn provide complimentary shell motion in the direction of the second axis for driving the mass load.

In accordance with further features of the present invention the flextensional transducer shell may be of different shape configurations. The shell may be of oval, elliptical or concave configuration. The transduction drive means may be comprised of a piezoelectric member or a magnetostrictive member. The piezoelectric member may be comprised of a plurality of sequentially arranged piezoelectric elements that may be connected either in series or in parallel. In the preferred embodiment described herein a pair of mass loads are provided comprised of a head load on one side of the shell and an inertial tail load on the other side of the shell with both of these loads secured to the shell along the second, or preferably minor, axis. The inertial tail load is heavier than the head load. A further embodiment of the present invention involves the use of a second flextensional transducer shell and associated transduction drive means along with means for interconnecting the shells along their respective axes. In still a further embodiment of the invention four or more electro-mechanical spring devices may be employed in a dual piston arrangement. In this instance a housing is provided for receiving the shell, drive means and mass loads. In still a further embodiment of the present invention the transduction drive means may be held at rest under compression by the shell for improved operation. In still a further arrangement the flextensional transducer shell may be comprised of concave plates with the transduction drive means comprised of a piezoelectric ring having the plates secured to opposite sides thereof.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

In accordance with the present invention, there is now described herein a number of different embodiments for practicing the invention. In accordance with one aspect of the invention there is provided a transducer for obtaining a low frequeney, large displacement by means of a piston transducer that can be constructed in a relatively compact size. In accordance with the present invention there is also provided a mechanical spring that may be energized by either piezoelectric or magnetostrictive members. In either instance the spring amplifies the motion of the active material and these eletromechanical springs may be combined either in series to obtain greater displacement or in parallel to obtain greater force. The electro-mechanical spring concepts illustrated herein may be also used in making an actuator, or valve, but are described primarily herein in association with acoustic transducers.

The invention described herein, in at least one embodiment, is illustrated by a low resonant, high power compact piston transducer employing a modular electro-acoustic flextensional spring section. This modular spring section (module) may be connected to other modules to obtain a very low resonant frequency. Also, an inertial mass is attached to one surface of the shell to reduce the motion and radiation thereat, and a piston is attached at the opposite side of the shell to produce a uniform motion.

The present invention describes a compliant electromechanical spring transduction device that may be driven by either piezoelectric or magnetostrictive means to provide motion that is magnified by a flexural-extensional (flextensional) induced bending motion providing large displacements at the central location on the shell which are coupled at this location to a load. The load may be in the form of a mass or may be comprised of additional electro-mechanical springs. In particular, when the shell is combined with front and rear masses the combination yields a lower resonant frequency for a given length than if the same piezoelectric or magnetostrictive material were used without the spring shell assembly. Also, with the present invention rugged, low frequency, high power, piston type transducers may be fabricated in a very compact form.

Figure 1A:
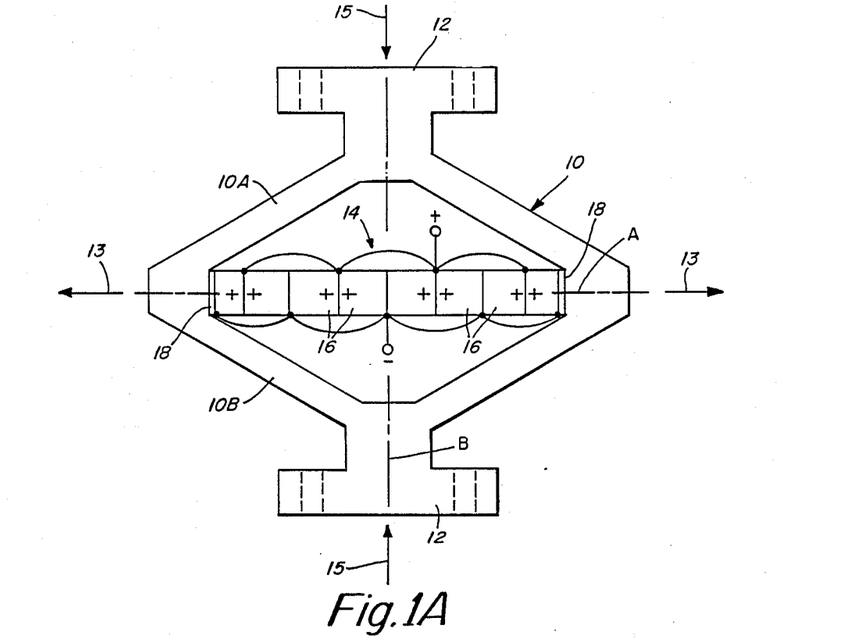
FIG. 1A schematically illustrates a piezoelectric spring assembly with end mounts.

One form of the electro-mechanical spring is shown in FIG. 1A with a piezoelectric driving system. In FIG. 1A the shell is illustrated at 10 and may be constructed of a rugged metal material. The shell 10 may be considered as having opposite sides 10A and 10B. A major axis is illustrated at A and a minor axis is illustrated at B. The axes A and B are disposed orthogonally to each other as illustrated. FIG. 1A also illustrates the end mounts 12 associated with the shell and disposed along the axis B.

FIG. 1A also illustrates the piezoelectric drive system at 14 which, in this particulr embodiment, is comprised of eight bars 16 wired in parallel and operated in the 33 mode for maximum output. Loads not specifically illustrated in FIG. 1A may be bolted, cemented or welded to the end mounts 12 which are located at the positions of maximum displacement of the shell.

In operation the piezoelectric stack expands during a positive cycle of an alternating voltage applied at the leads. This causes the ends of the spring to move outward as shown by the arrows 13 at the shell major axis ends. The outward motion of these shell ends causes the orthogonal surfaces and connected end mounts 12 to move inward (see arrows 15) with a magnified displacement approximately equal to the ratio of the major or to minor dimensions of the shell. On the negative cycle the process reverses and the ends mounts 12 move outward as the piezoelectric stack decreases in size.

Figure 2:
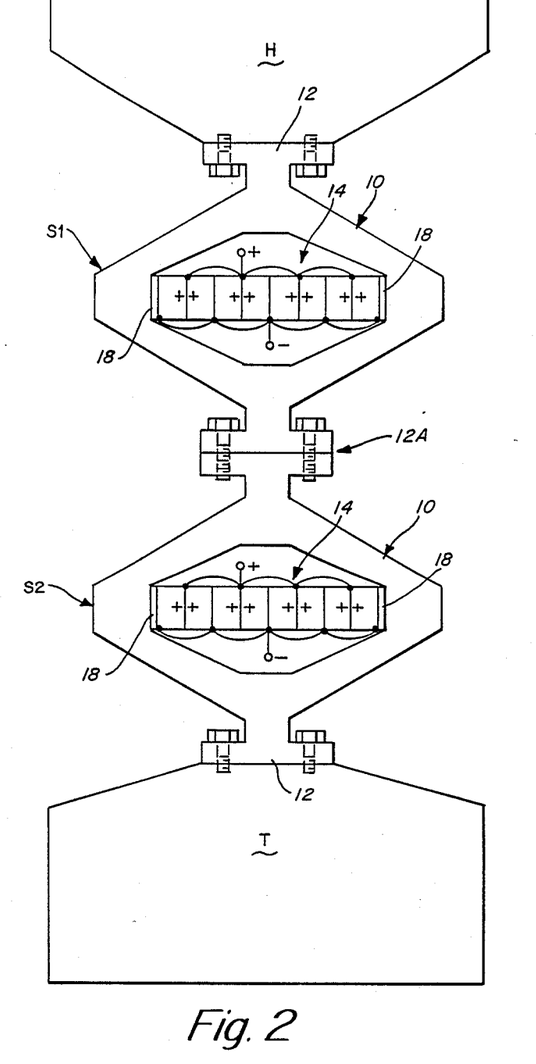
FIG. 2 illustrates a pair of electro-mechanical transducers used to drive a head mass relative to a more massive inertial tail mass.

The shell 10, as illustrated in FIG. 1A, as well as in FIG. 2, may be electrically isolated from the electric voltage at the ends of the piezoelectric stack by means of mechanically stiff, electrical insulators at the stack ends as illustrated at 18.

FIG. 1A may be considered as an end view of an open ended, somewhat cylindrical structure. For a more detailed embodiment refer now to FIG. 1C that illustrates a slightly different piezoelectric drive system employing somewhat different configuration end amounts to be described in further detail hereinafter. The perspective view of FIG. 1C illustrates four piezoelectric pieces 16. There is illustrated in FIG. 1C an alternate means for mounting mechanical loads along the minor axis B. In this regard, the shell 10 is considered as being comprised of two opposite flat surfaces 12A each having a pair of bolt holes or threaded holes as illustrated at 12B, for connection to other shells or to a piston or inertial mass. If this shell structure has any substantial length then a number of parallel stacks may be needed, spaced apart appropriately along the shell.

FIGS. 1A and 1C illustrate the driving stack 14 as being comprised of a series of piezoelectric elements 16. Alternatively, the driving stack could also be a single piezoelectric bar operated in the 31 mode. Alternatively, it may be in the form of a planar mode piezoelectric disc if the shell is constructed in the shape of two cones generated by rotation about the minor axis B of the shell cross section of FIG. 1A. The figure of revolution is comprised of a stiffer structure than is illustrated in FIG. 1C. In this regard, refer to FIG. 1D. This illustrates a less stiff and preferred configuration.

Figure 1B:
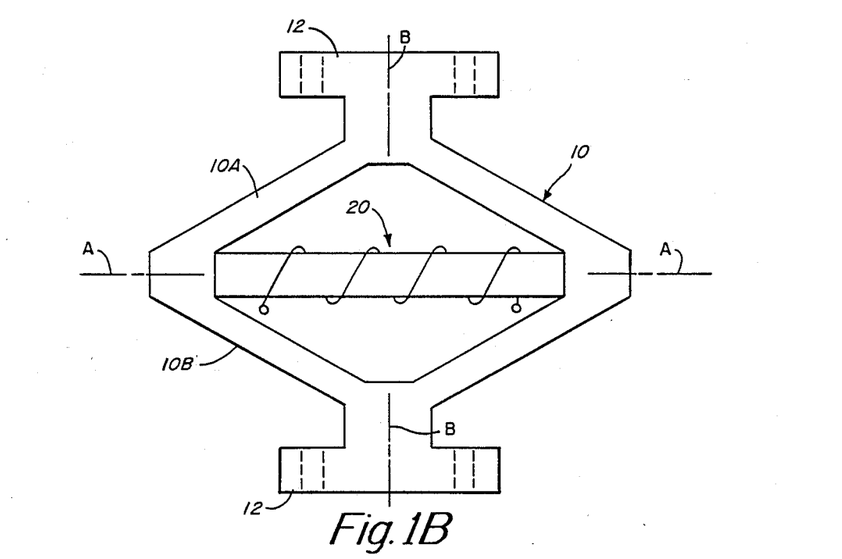
FIG. 1B schematically illustrates a magnetostrictive spring assembly with end mounts.
Figure 1C:
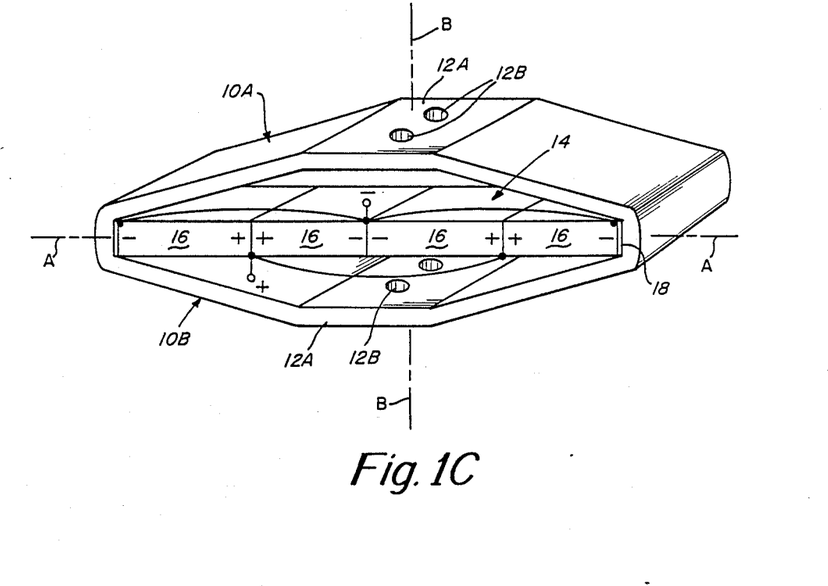
FIG. 1C is a perspective view of the assembly of FIG. 1A.
Figure 1D:
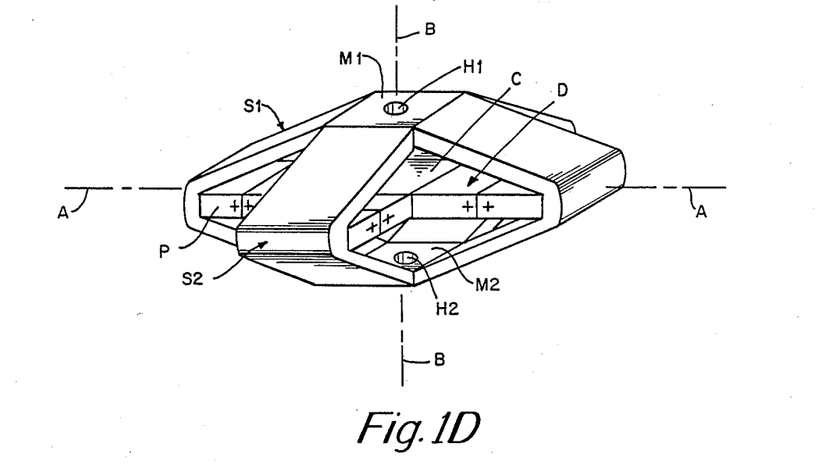
FIG. 1D is a perspective view of an alternate construction of piezoelectric spring assembly.

FIG. 1D illustrates orthogonally disposed and commonly interconnected shells S1 and S2 having at opposite sides of the transducer flat mounting surfaces M1 and M2. Each of these surfaces has associated therewith mounting holds H1 and H2.

In FIG. 1D the piezoelectric driver is illustrated at D and is comprised of a plurality of piezoelectric pieces P arranged in a cross pattern and interconnected by means of a centrally disposed, non-piezoelectric member C.

In FIG. 1D the configuration is less stiff than that of FIG. 1C. The piece C, as mentioned, is a stiff centrally disposed non-piezoelectric member. The loads are attached at the two flat surfaces M1 and M2. The bolt holes H1 and H2 allow rigid attachment. Alternatively, a strong adhesive weld may also be used at the surfaces M1 and M2.

Reference is now made to FIG. 1B for an illustration of a magnetostrictive drive member 20. In this embodiment of the invention the magnetostrictive member may be constructed of laminated nickel or the highly active rare earth magnetostrictive alloy Terfenol D ($Tb_{0.3}Dy_{0.7}Fe_2$). In the embodiment of FIG. 1B a second magnetostrictive element may be disposed in parallel with the one illustrated and with the further use of magnetic couplers to complete the magnetic circuit, if necessary.

In connection with the use of the magnetostrictive alloy Terfenol D, as well as connection with other materials, it is noted that operation is improved when the material is under compression. This may be obtained by means of expanding the spring through compression on the end mounts. By compressing on the end mounts then the shell expands outwardly at its central area. The magnetostrictive material such as the Terfenol D can then be inserted and this is followed by a release of the compression allowing the shell to now return back to its rest position at the same time compressing the Terfenol D. Alternatively, an additional stress bolt or bolts may be used to compress the material. In this connection it is noted the piezoelectric material would also benefit from these compression procedures because this material is stronger in compression than it is in tension.

The electro-mechanical springs may be used in a number of applications such as valves, actuators or underwater sound transducers. They may also be connected together to increase the displacement and when used with masses to also lower the resonant frequency as illustrated in FIG. 2. The electrical leads may be connected in parallel (plus to plus and minus to minus) or series (plus to minus). With further reference to FIG. 2, it is noted that in this particular embodiment of the invention there is illustrated the head mass H and the inertial tail mass T. These are secured to respective end mounts 12 associated with the springs S1 and S2. FIG. 2 also illustrates that the springs S1 and S2 are interconnected at their mounts to provide coupling therebetween as illustrated at 12 A in FIG. 2.

With m being the head mass H, M the tail mass T, and K the stiffness of one of the electro-mechanical springs, the resonant frequency is approximately:

$$f = (1/2\pi)\sqrt{K/m}\sqrt{(1 + m/M)/N}$$

where N is the number of electro-mechanical springs which we have assumed, for simplicity, to be massless in this approximation. Since the springs are more compliant than the piezoelectric material, only a small number may be necessary. In a piston type transducer design the head piston moves at a velocity relative to the tail velocity in the ratio of the tail to head mass ratio. The larger the tail mass, the greater the head motion and the lower the resonant frequency.

Figure 3:
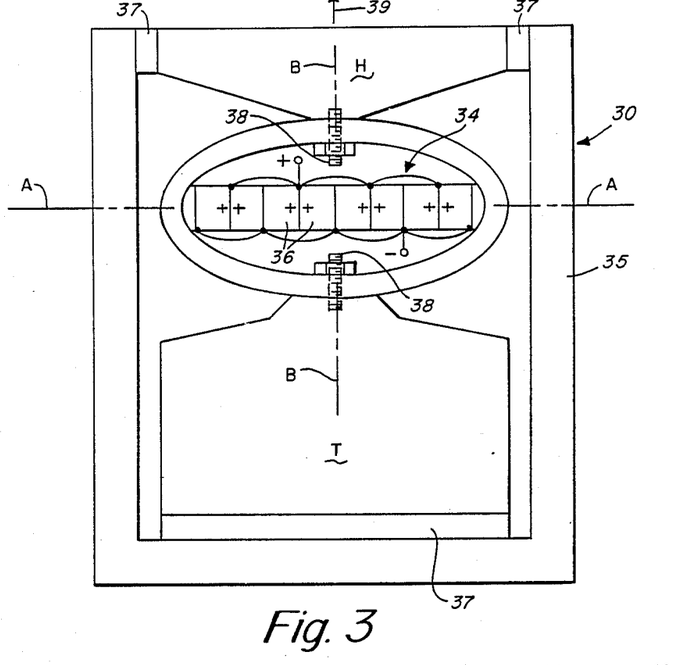
FIG. 3 illustrates a further embodiment of the invention in which the shell is oval, driven by a piezoelectric member and adapted to drive a head mass with the tail mass, head mass and shell all enclosed in a water-tight housing.

This spring illustrated in FIGS. 1A and 1B may also be configured in the form of an ellipse or oval as illustrated in FIG. 3. The FIG. 3 embodiment is in the form of an underwater acoustic transducer piston including a housing 35 having isolation means at 37 to isolate back radiation by preventing the fluid from flooding the interior. FIG. 3 illustrates the head mass H and the tail mass T having the spring transducer disposed therebetween. In the illustrated embodiment the masses H and T are shaped to receive the shell 30. Alternatively the oval shell may have flat areas on its oppositely disposed surfaces to mate to the head and tail masses. Bolts 38 are illustrated for securing the opposite sides of the shell with the head mass H and the tail mass T. In the embodiment of FIG. 3 the drive system is a piezoelectric driver 34 comprised of eight separated piezoelectric elements 36. In this embodiment of the invention as the piezoelectric stack oscillates, the head mass (and to a lesser extent the tail mass) moves with magnified motion and the head mass H alone produces radiation into the medium. This is illustrated by the arrow 39 in FIG. 3.

In connection with the embodiment of FIG. 3, it is noted that the head mass H functions as a lumped point mass and it moves with uniform motion at a magnitude equal to the maximum motion of the shell which occurs at the area of the bolt 38. The tail mass is similarly connected to the shell along the minor axis B. Thus, the tail mass T is also connected at the point of maximum motion. However, the tail mass T is massive, and it moves less than the shell 30 or the head mass H resulting in additional net motion of the head mass H.

Figure 4:
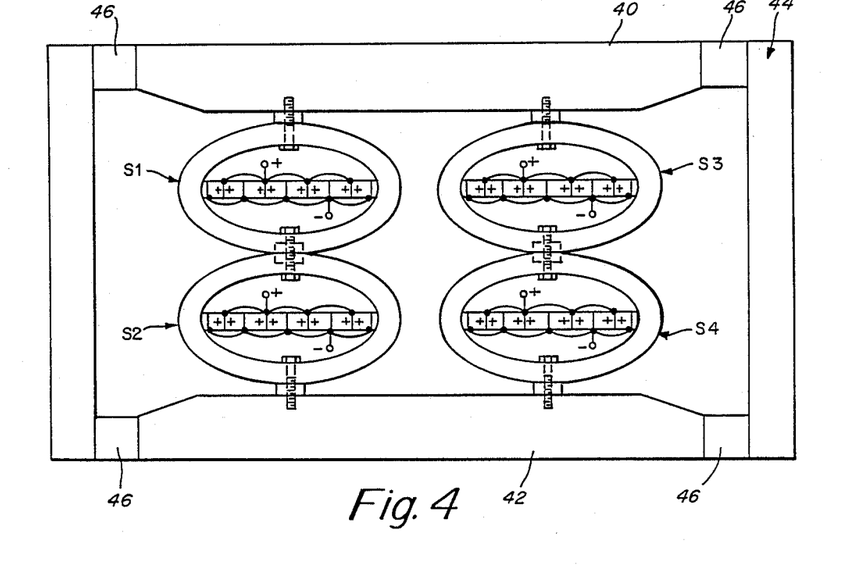
FIG. 4 illustrates four piezoelectric springs driving two equal head masses or radiating pistons.

An alternate arrangement with equal weight tail and head masses and configured as a dual piston device is illustrated in FIG. 4. This embodiment of the invention illustrates four springs S1, S2, S3 and S4. Each of these springs is substantially of the construction illustrated previously in FIG. 3 with the shell being of oval configuration and the drivers being of multi-element piezoelectric drivers. The electro-mechanical springs are arranged in a 2 by 2 array coupled between the tail and head masses identified in FIG. 4 as dual pistons 40 and 42. FIG. 4 also illustrates isolation at 46 and furthermore illustrates the housing at 44. The housing 44 encloses the pistons and springs.

In FIG. 4 the pistons 40 and 42 move with the same velocity. The electro-mechanical springs S1-S4 are disposed in both series and parallel mechanical arrangements. The parallel arrangement provides better insurance against piston flexing and also provides greater force. The oval shells are also shown connected in mechanical series.

Figure 5:
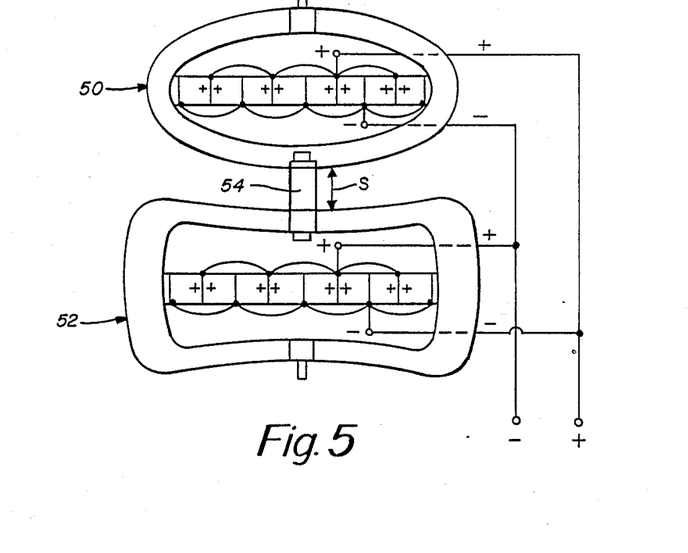
FIG. 5 illustrates a further embodiment of the invention employing both concave and convex shells combined to form a dual compact spring.

Reference is now made to FIG. 5 for an illustration of a further embodiment of the present invention illustrating a convex or oval shell 50 in combination with a concave shell 52. This forms a more compact spring arrangement including a separator S. When the separator S is made short in length the overall arrangement is, in particular, quite compact. It is noted in this embodiment, as illustrated by the wiring, because of the opposite motion of the shell types, the piezolectric drivers are wired in opposite phase to attain additive mechanical motion.

Figure 6:
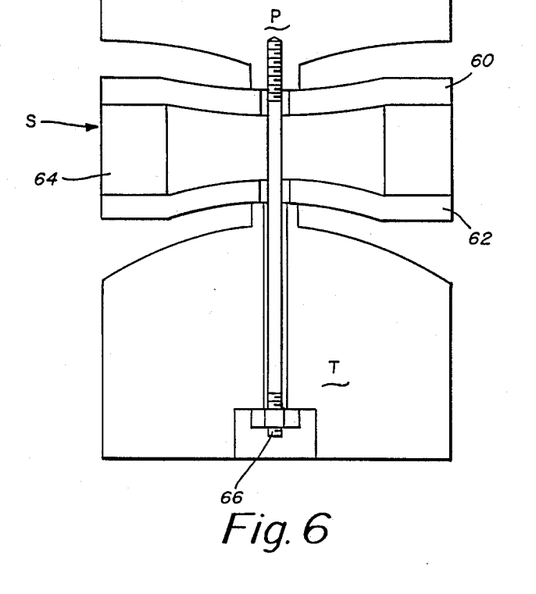
FIG. 6 illustrates still a further embodiment of the invention employing circular concave plates for the shell and a piezoelectric ring for driving a circular piston.

An axi-symmetric form of the electro-mechanical spring is shown in cross section in FIG. 6. The electro-mechanical spring is illustrated in an underwater piston transducer application. In the embodiment of FIG. 6 the transducer is comprised of a piston mass P and a tail mass T. The spring is illustrated at S. The piston and tail masses may be assumed to be circular as is the spring S.

The spring S is comprised of two circular concave plates 60 and 62 attached to the ends of a piezoelectric ring 64 shown in FIG. 6 in a cross section. The ring 64 may be activated in the 31 mode, or as illustrated, in the 33 mode of electro-mechanical operation. As illustrated in FIG. 6 the circular piston P, the inertial tail mass T and the spring S are interconnected by the comprssive bolt 66.

Under a positive cycle of operation, the ring 64 expands and causes the two concave shell plates 60 and 62, which are firmly fixed to the ring 64, to move outward causing the piston P to move with maximum motion at the center of the curved circular plates. The plates 60 and 62 may alternatively be convex rather than the illustrated concave plates. However, the concave arrangement is preferred because of its compactness. FIG. 6 also illustrates the preferred stress bolt 66 that is used to compress the piezoelectric ring as well as to hold the piston and tail masses together with the spring.

Figure 7A:
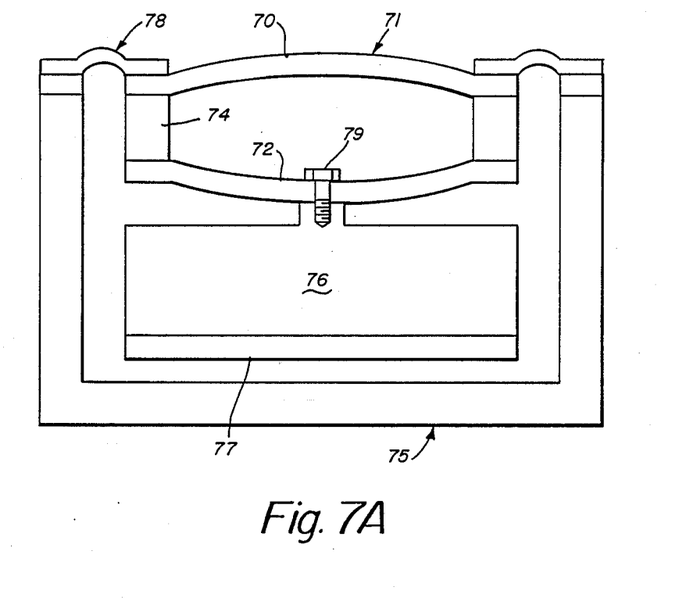
FIG. 7A illustrates an alternate embodiment of the invention in the form of a direct radiator.

An alternate embodiment to that of FIG. 6 is now illustrated in FIG. 7A. In the embodiment of FIG. 7A convex shells or plates 70 and 72 are employed with their being provided only one mass, illustrated in FIG. 7A as the inertial tail mass 76 attached by bolt 79 to one of the circular convex plates, namely plate 72. FIG. 7A illustrates the plates and mass disposed in housing 75. The inertial tail mass 76 has associated with there a mechanical isolator 77. The circular convex plates 70 and 72 are interconnected by a piezoelectric ring 74. A compliant member 78 interconnects the plate 70 with the housing.

In FIG. 7A the inertial tail mass 76 inhibits the movement of the center part of the lower plate 72 while the upper plate 70 is free to move and radiate sound into the medium. The radiating surface is illustrated at 71. In this embodiment no piston mass is used and, consequently the preferred uniform piston motion is not obtained. However, the implementation is simpler. The motion of the plate 72 is a result of the sum of the bending motion of the curved plate 70 along with the added motion of the edge of plate 70 moving as a reaction result of the inertial mass inhibiting the motion of the center of the plate 70. As indicated previously, a housing is illustrated with a flexible annular surround 78 to seal the interior and provide radial support without inhibiting the orthogonal motion in the direction of axis B. The configuration illustrated in FIG. 7A is well suited for operation in air as well as in water.

Figure 7B:
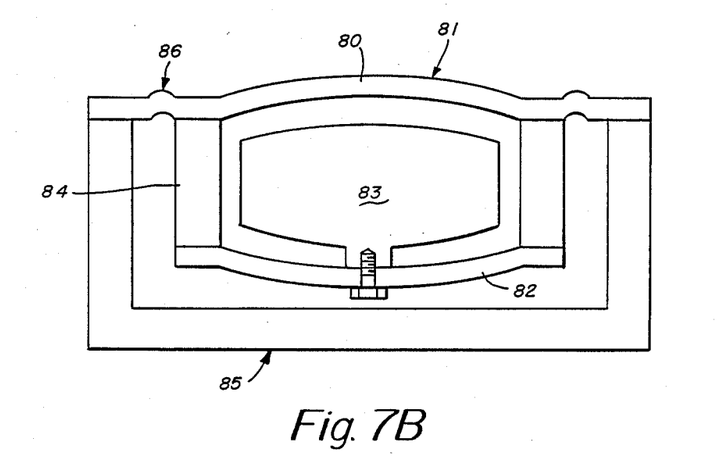
FIG. 7B illustrates an alternate embodiment to that of FIG. 7A in a more compact configuration.

FIG. 7B illustrates a further alternate embodiment of the invention quite similar to that illustrated in FIG. 7A but having the mass 83 disposed between the shell plates 80 and 82. The components are disposed in a housing 85 and the plates are interconnected by a piezoelectric ring 84. A compliant annulus 86 is also provided.

In the embodiment of FIG. 7B it is noted that the overall arrangement is quite compact. The interior inertial tail mass 83 is disposed between the plates 80 and 82 so as to provide this compactness. Also, the plate 80 is essentially a single piece front plate having a radiating surface 81.

In the embodiments of the invention described herein, the shell is preferably made from a high strength material such as aluminum, steel, glass reinforced plastic, or a fiber composite. As illustrated previously, the drive system may be piezoelectric or magnetostrictive, or possibly a combination of thereof.

The particular embodiments described herein all relate to the transmission of energy outwardly from the transducer. However, when the transducer is properly biased either the piezoelectric or the magnetostrictive diversions thereof may be used equally well as a means for the reception of energy in addition to the projection of energy. In other words the system of the present invention is reciprocal.

Although the foregoing discussion has been based primarily on underwater application, this invention is not limited to such applications, and the principals and teachings set forth herein may also be applied to application in solid materials and in gasses. In a case of gasses the choice of particular materials may be different in order to obtain a better match to the impedance of the gas. For example in the case of an audio transducer for air usages, say as a replacement for a loud speaker, the piezoelectric material may be in the form of a piezoelectric plastic or composite form and the shell and piston may also be plastic or a light but stiff composite material.

A further feature of the present invention illustrated from the foregoing drawing is that the electro-mechanical drive system of this invention is adapted to move in a direction that is preferable orthogonal to the direction of the desired motion thus allowing a reduced transducer length along the direction of the desired motion yielding a more compact design. To provide the desired amplification in accordance with the present invention the transducer is preferably comprised of a closed shell with a major dimension and an orthogonal minor dimension and driven along its major dimension by a piezoelectric or magnetostrictive transduction mechanism which produces amplified motion along the direction of the minor dimension so that one or more loads attached on the shell at the locations of maximum motion ca be employed to provided enhanced transducer action particularly at a low resonant frequencies.

Having now described a limited number of embodiments of the present invention, it should now become apparent to those skilled in the art that numerous other embodiments and modifications thereof are contemplated as falling within the scope of the present invention as defined by the appended claims.

What is claimed is:

1. An electro-mechanical transduction apparatus comprising;
   a flextensional transducer shell having orthogonally disposed first and second shell axes,
   a transduction drive means having opposed ends,
   means connecting the transduction drive means at its opposed ends to the flextensional transducer shell and disposed along said first shell axis,
   a mechanical load,
   means connecting the load to the flextensional transducer shell at at least one location along said second shell axis and at a position outside of said transducer shell,
   and means for exciting said transduction drive means to cause said shell to move in the direction of said first axis to in turn provide complementary shell motion in the direction of said second axis for driving said load to, in turn, provide energy radiation therefrom.

2. An electro-mechanical transduction apparatus as set forth in claim 1 wherein said first axis is a major axis and said second axis is a minor axis.

3. An electro-mechanical transduction apparatus as set forth in claim 2 wherein said shell is of substantially oval shape.

4. An electro-mechanical transduction apparatus as set forth in claim 2 wherein said shell is of substantially elliptical shape.

5. An electro-mechanical transduction apparatus as set forth in claim 1 wherein said transduction drive means comprises a piezoelectric member.

6. An electro-mechanical transduction apparatus as set forth in claim 1 wherein said transduction drive means comprises a magnetostrictive member.

7. An electro-mechanical transduction apparatus as set forth in claim 1 wherein said transduction drive means comprises a plurality of sequentially arranged piezoelectric elements.

8. An electro-mechanical transduction apparatus as set forth in claim 1 wherein said mechanical load is disposed on only one side of said shell.

9. An electro-mechanical transduction apparatus as set forth in claim 7 wherein said piezoelectric elements are connected in parallel.

10. An electro-mechanical transduction apparatus as set forth in claim 1 including a pair of loads comprised of a head load on one side of the shell and an inertial tail load on the other side of the shell, both said loads secured to the shell along said second axis.

11. An electro-mechanical transduction apparatus comprising;
    a flextensional transducer shell having orthogonally disposed first and second shell axes,
    a transduction drive means having opposed ends,
    means connecting the transduction drive means at its opposed ends to the flextensional transducer shell and disposed along said first shell axis,
    a load,
    means connecting the load to the flextensional transducer shell at at least one location along said second shell axis,
    and means for exciting said transduction drive means to cause said shell to move in the direction of said first axis to in turn provide complementary shell motion in the direction of said second axis for driving said load,
    wherein said load comprises a pair of loads including a head load on one side of the shell and an inertial tail load on the other side of the shell, both said loads secured to the shell along said second axis,
    said inertial tail load being heavier than said head load.

12. An electro-mechanical transduction apparatus as set forth in claim 10 including a second flextensional transducer shell and transduction drive means, and means interconnecting said shells along their respective second axes.

13. An electro-mechanical transduction apparatus as set forth in claim 10 including a housing for receiving said shell, drive means and loads.

14. An electro-mechanical transduction apparatus as set forth in claim 1 wherein said means connecting the transduction drive means to the shell comprises end insulator means.

15. An electro-mechanical transduction apparatus as set forth in claim 12 wherein one shell is oval and the other shell is concave.

16. An electro-mechanical transduction apparatus as set forth in claim 1 wherein said transduction drive means is held at rest under compression by said shell.

17. An electro-mechanical transduction apparatus as set forth in claim 1 wherein said flextensional transducer shell is of concave shape.

18. An electro-mechanical transduction apparatus as set forth in claim 17 wherein said flextensional transducer shell is comprised of concave plates, and said transduction drive means comprises a piezoelectric ring having the plates secured to opposite sides thereof.

19. An electro-mechanical transduction apparatus as set forth in claim 1 wherein said flextensional transducer shell is a closed shell.

20. An electro-mechanical transduction apparatus comprising:
    a flextensional transducer shell,
    a transduction drive means,
    means connecting the transduction drive means to the flextensional transducer shell for driving said transducer shell,
    said flextensional transducer shell being comprised of a pair of commonly interconnected and orthogonally disposed shell members,
    and said transduction drive means comprised of a pair of commonly interconnected and orthogonally disposed transduction drive members.

21. An electro-mechanical transduction apparatus as set forth in claim 20 wherein said transduction drive means is of cross-shape having a centrally disposed common, non-piezoelectric piece.

22. An electro-mechanical transduction apparatus as set forth in claim 1 wherein said flextensional transducer shell is comprised of a pair of convex plates and said transduction drive means comprises a piezoelectric ring.

23. An electro-mechanical transduction apparatus as set forth in claim 22 wherein said mass load is connected to one of said convex plates.

24. An electro-mechanical transduction apparatus as set forth in claim 23 wherein said mass load is positioned between said plates.

25. A piston transducer comprising, a shell having oppositely disposed surfaces extending along a first axis, a transduction driver coupled to said shell and extending along a second axis substantially orthogonal to said first axis, a first piston mass coupled to one side of said shell at said first axis, and a second piston mass connected to the opposite side of said shell at said first axis at least one of said piston masses being disposed outside of said shell and responsive to shell motion.

26. A piston transducer as set forth in claim 5 wherein said transduction drive means comprises a piezoelectric ring.

27. A piston transducer comprising, a shell having oppositely disposed surfaces extending along a first axis, transduction driver couples said shell and extending along a second axis substantially orthogonal to said first axis, the first piston mass couples to one side of said shell at said first axis, and a second piston mass connected to the opposite side of said shell at said first axis, said first piston mass comprising an active piston and said second piston mass comprising an inertial mass, said inertial mass being substantially larger in mass than said piston mass.

28. A piston transducer comprising, a shell having oppositely disposed surfaces extending along a first axis, a transduction driver coupled to said shell and extending along a second axis substantially orthogonal to said first axis, a first piston mass coupled to one side of said shell at said first axis, and a second piston mass connected to the opposite side of said shell at said first axis, said shell comprised of two separate plates secured to the transduction driver with the transduction driver disposed therebetween.

29. A piston transducer as set forth in claim 28 wherein said plates are concave.

30. A piston transducer as set forth in claim 28 wherein said plates are convex.

31. A piston transducer as set forth in claim 28 including a compression means for securing together said shell and masses while at the same time compressing the transduction driver.

32. A piston transducer as set forth in claim 28 wherein said plates are convex and said transduction driver comprises a piezoelectric ring.

33. An electro-mechanical transduction system comprised of:
first and second electro-mechanical transduction members, each of said member including;
a flextensional transducer shell having orthogonally disposed first and second shell axes,
a transduction drive means having opposed ends,
and means connecting the transduction drive means at its opposed ends to the flextensional transducer shell for driving the shell along its first axis,
means for mechanically interconnecting said member shells in adjacent position at respective positions along their respective second axes,
and means for exciting said member transduction drive means to cause said shells to move in the direction of their respective first axes to in turn provide complementary and additive shell motion in the common direction of said second axes.

34. An electro-mechanical transduction system as set forth in claim 33 including a load and means connecting the load to one of said shells at a location along said shell second axis.

35. An electro-mechanical transduction system as set forth in claim 34 including a second load and means connecting the second load to the other shell at a location along said other shell second axis.

36. An electro-mechanical transduction system as set forth in claim 34 wherein said load is disposed at a position outside of said shell.

37. An electro-mechanical transduction apparatus comprising:
a flextensional transducer shell having orthogonally disposed first and second shell axes,
a transduction drive means having opposed ends,
means connecting the transduction drive means at its opposed ends to the flextansional transducer shell and disposed along said first shell axis,
a load,
means for connecting the load to the flextensional transducer shell at at least one location along said second shell axis,
and means for exciting the transduction drive means to cause said shell to move in the direction of said first axis to in turn provide complementary shell motion in the direction of said second axis for driving said load,
said mechanical load beng disposed asymmetrically in relation to the first shell axis.

* * * * *